United States Patent [19]

Senf

[11] Patent Number: 4,789,100
[45] Date of Patent: Dec. 6, 1988

[54] MULTIPLE FLUID PUMPING SYSTEM

[75] Inventor: John W. Senf, San Carlos, Calif.

[73] Assignee: Adhesive Engineering Company, San Carlos, Calif.

[21] Appl. No.: 445,840

[22] Filed: Nov. 30, 1982

Related U.S. Application Data

[63] Continuation-in-part of Ser. No. 203,880, Nov. 4, 1980, abandoned.

[51] Int. Cl.⁴ ............................................... B05B 7/00
[52] U.S. Cl. .................................... 239/61; 222/71; 222/134; 222/145; 239/68; 239/304; 239/432
[58] Field of Search ................... 239/61, 68, 146, 286, 239/302–304, 307, 308, 310, 379, 407, 412, 413, 427, 432; 137/461, 566, 567, 896, 605; 222/64, 65, 71, 134, 135, 138, 144.5, 145

[56] References Cited

U.S. PATENT DOCUMENTS

| | | | |
|---|---|---|---|
| 2,608,439 | 8/1952 | Bates et al. | 239/286 X |
| 2,819,928 | 1/1958 | Liedburg | 239/304 |
| 3,008,808 | 11/1961 | Hodges | 239/407 X |
| 3,067,987 | 12/1962 | Ballou et al. | 222/145 X |
| 3,079,090 | 2/1963 | Decker | 239/304 X |
| 3,097,764 | 7/1963 | Loeser | 239/304 X |
| 3,104,824 | 9/1963 | Hayes | 239/304 |
| 3,207,378 | 9/1965 | Trumbell et al. | 222/134 |
| 3,223,040 | 12/1965 | Dinkelkamp | 222/134 X |
| 3,263,932 | 8/1966 | Ruland | 239/304 |
| 3,298,383 | 1/1967 | Cooper | 222/134 X |
| 3,393,834 | 7/1968 | Snyder | 222/64 |
| 4,169,545 | 10/1979 | Decker | 222/136 |

Primary Examiner—Johnny D. Cherry
Attorney, Agent, or Firm—Robert R. Tipton

[57] ABSTRACT

An apparatus for mixing and dispensing multiple fluids utilizes two fluid reservoirs each in fluid communication with a respective pump for pumping the fluids to a mixing head, the pumps being mechanically connected to each other and adapted to pump fluids from the reservoirs at a predetermined volume ratio, and with a pressure switch provided for measuring fluid pressure to the mixing head and stopping the pumping of fluid at a predetermined maximum pressure while starting the pumping of fluid when the fluid pressure falls below the predetermined maximum pressure. A device for detecting an empty fluid reservoir is used to stop the pumping of fluids to avoid single component pumping. A mechanical torque-releasable coupling is used to disconnect a pump from the pump drive in the event of an internal pump overload.

6 Claims, 4 Drawing Sheets

MULTIPLE FLUID PUMPING SYSTEM

CROSS-REFERENCE TO RELATED APPLICATION

This application is a continuation-in-part of application Ser. No. 06/203,880, filed Nov. 4, 1980, now abandoned.

BACKGROUND OF THE INVENTION

This invention relates generally to fluid dispensing apparatus, and, in particular, to multiple fluid mixing and dispensing apparatus.

Prior art devices used to pump two or more fluids to a mixing head where the fluids are sprayed onto a surface or injected into a cavity are relatively common.

Some devices utilize independently driven fluid pumps in which the driving means is regulated to obtain a predetermined ratio of fluid volume flow and in which the pressure and temperature of the separate fluids are also monitored to assure a uniformity of result.

Other devices utilize various differing methods of obtaining a predetermined ratio of fluid volume being pumped. Some devices achieve this result by varying the orifice size of a venturi to vary the suction rate at which the fluids are withdrawn from their reservoirs. Other devices utilize piston and gear arrangements in the mixing head for metering the flow of fluid.

Still other devices use several pumping cylinders of different volumes linked by an actuator arm to simultaneously pump fluids at a predetermined mix ratio.

Other devices use positive displacement pumps having a fixed volume ratio, however, an adjustable length actuating arm is used to vary the ratio of stroke length, and therefore volume, when simultaneously pumping from their respective fluid reservoirs.

SUMMARY OF THE INVENTION

The apparatus of the present invention is an improvement over the prior art devices and comprises, basically, a main housing enclosing first and second fluid pumps pumping fluid from first and second fluid reservoirs, respectively, mounted on top of the housing, to a mixing and dispensing head.

The apparatus of the present invention further comprises a means for measuring the pressure to the fluid mixing head including a pressure switch adapted to maintain the flow of the two fluids between a maximum and minimum pressure.

The apparatus of the present invention additionally comprises a detector at each reservoir for stopping the pumping of fluid upon the emptying of either fluid reservoir.

The apparatus of the present invention further comprises a mechanical coupling connected between the pumps whereby a predetermined fluid volume flow ratio for the two fluids is achieved.

Additionally, the apparatus of the present invention includes adjusting pump speed relative to pump displacement to compensate for fluid viscosities.

A steering handle, lifting eye and wheels are also combined with the apparatus of the present invention and are connected to the main housing for movement of the apparatus about the work site.

It is, therefore, an object of the present invention to provide an apparatus for mixing and dispensing two or more fluids.

It is a further object of the present invention to provide an apparatus for mixing and dispensing multiple fluids utilizing disposable fluid reservoirs.

It is another object of the present invention to provide a multiple fluid mixing and dispensing apparatus in which a means is provided to maintain fluid flow to the mixing head between a maximum and minimum pressure value.

It is still another object of the present invention to provide a multiple fluid mixing and dispensing apparatus in which the depletion of any reservoir causes the pumping of all fluids to stop.

It is yet another object of the present invention to provide a multiple fluid mixing and dispensing apparatus in which the pumps are mechanically disconnected from the driver upon internal overload of the pump.

It is a further object of the present invention to provide a multiple fluid mixing and dispensing apparatus in which a torque coupling is used to disconnect a pump from the pump driver upon overload of the pump.

It is a further object of the present invention to provide a multiple fluid mixing and dispensing apparatus in which the fluid reservoirs are mounted on top of the main housing.

It is another object of the present invention to provide a multiple fluid mixing and dispensing apparatus in which the vehicle on which the apparatus is mounted has a low center of gravity.

These and other objects of the present invention will become manifest upon careful study of the following detailed description when taken together with the drawings.

Figure 1:
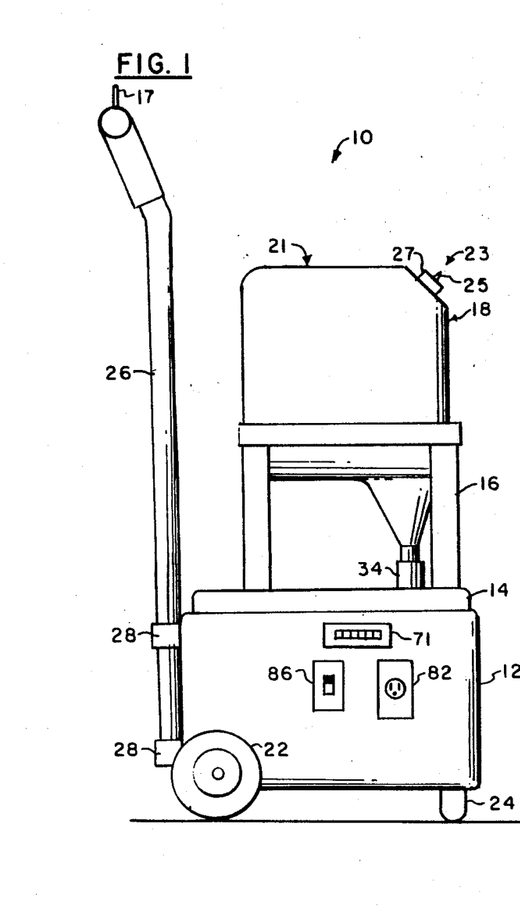
FIG. 1 is an elevational side view of the multiple fluid mixing and dispensing apparatus of the present invention.
Figure 2:
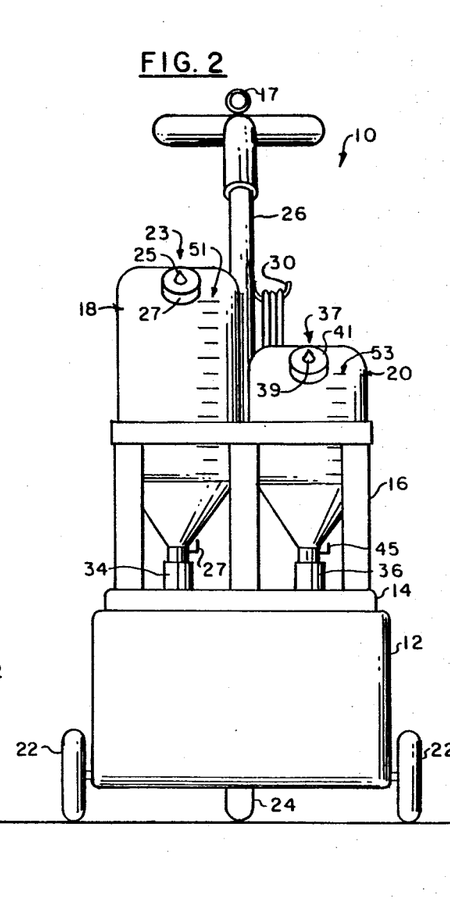
FIG. 2 is an elevational front view of the multiple fluid mixing and dispensing apparatus of the present invention.
Figure 3:
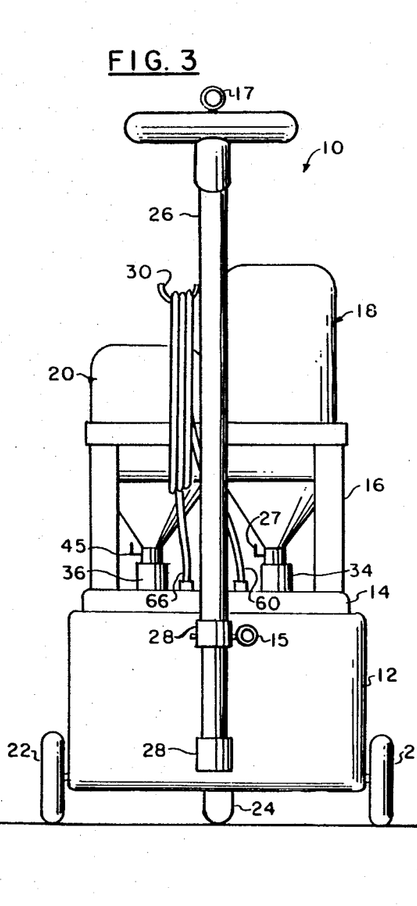
FIG. 3 is an elevational rear view of the multiple fluid mixing and dispensing apparatus of the present invention.

With reference to FIG. 1, 2 and 3, there is illustrated, respectively, side, front and rear elevational views of the assembled multiple fluid mixing and dispensing apparatus 10 of the present invention comprising, basically, a main housing 12 containing the pumps and controls (not shown in FIG. 1, 2 or 3) for pumping fluid to the mixing head (not shown in FIGS. 1, 2 or 3).

A hinged lid 14 is connected proximate the top of housing 12. removable support bracket 16, adapted to support a pair of disposable fluid reservoirs 18 and 20, is attached to the top of lid 14.

A pair of wheels 22 are connected to housing 12 proximate the rear thereof so that the apparatus can be conveniently moved about the job site. A pair of level supports 24 are attached to the underside of housing 12 proximate the front thereof to maintain the apparatus level during use and storage.

A steering handle 26 is connected to the rear of housing 12 by handle support brackets 28. A hose or fluid conduit support bracket 30 is attached to steering handle 26 to support fluid supply conduits 60 and 66 when the apparatus is moved about the job site or stored after use.

Figure 6A:
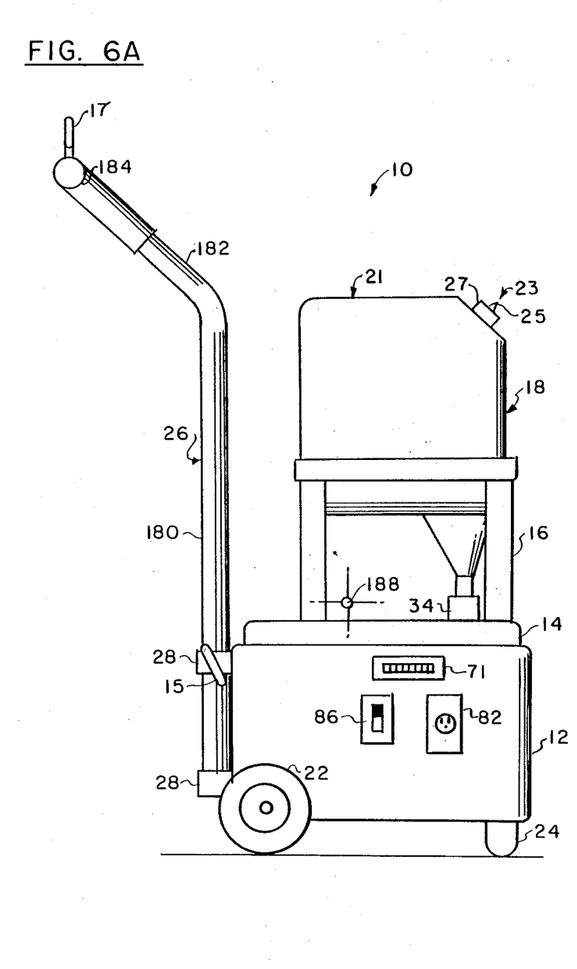
FIGS. 6A and 6B are detailed drawings illustrating the positioning of the operating handle and lifting eye relative to the center of gravity of the apparatus.
Figure 6B:
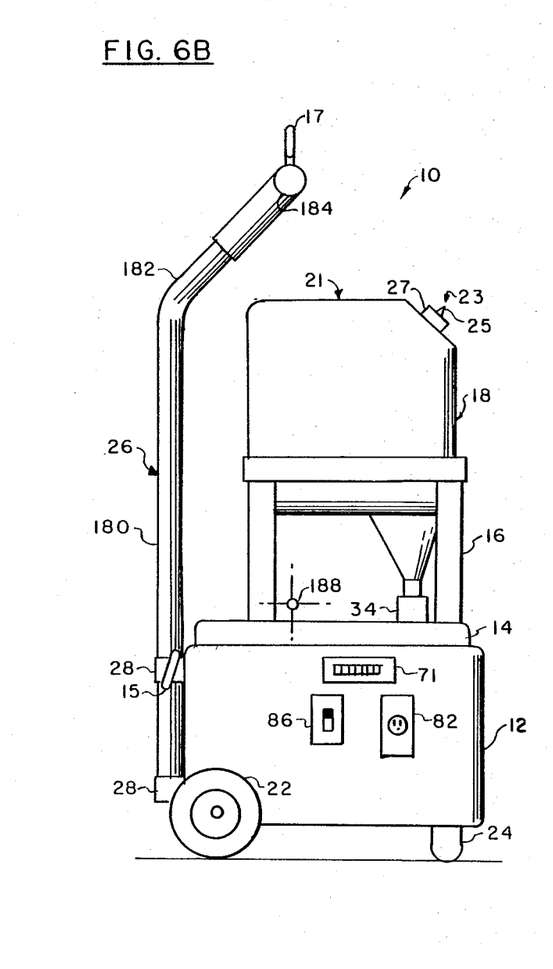

With particular reference to FIGS. 1 and 2, it will be noted that steering handle 26 is removable from handle support bracket 28, being retained in position by retaining pin 15. In addition, steering handle 26 can be rotated 180 degrees, as shown in FIGS. 6A and 6B, to permit lifting eye 17 to project inwardly over center of gravity 188 of housing 12, reservoir support bracket 16 and reservoirs 18 and 20. This permits convenient lifting of the apparatus by a crane or other device at the construction site.

Quick coupling fluid inlet connectors 34 and 36 are also attached to the top of lid 14 and, respectively, connect fluid reservoirs 18 and 20 into the fluid flow system.

Figure 4:
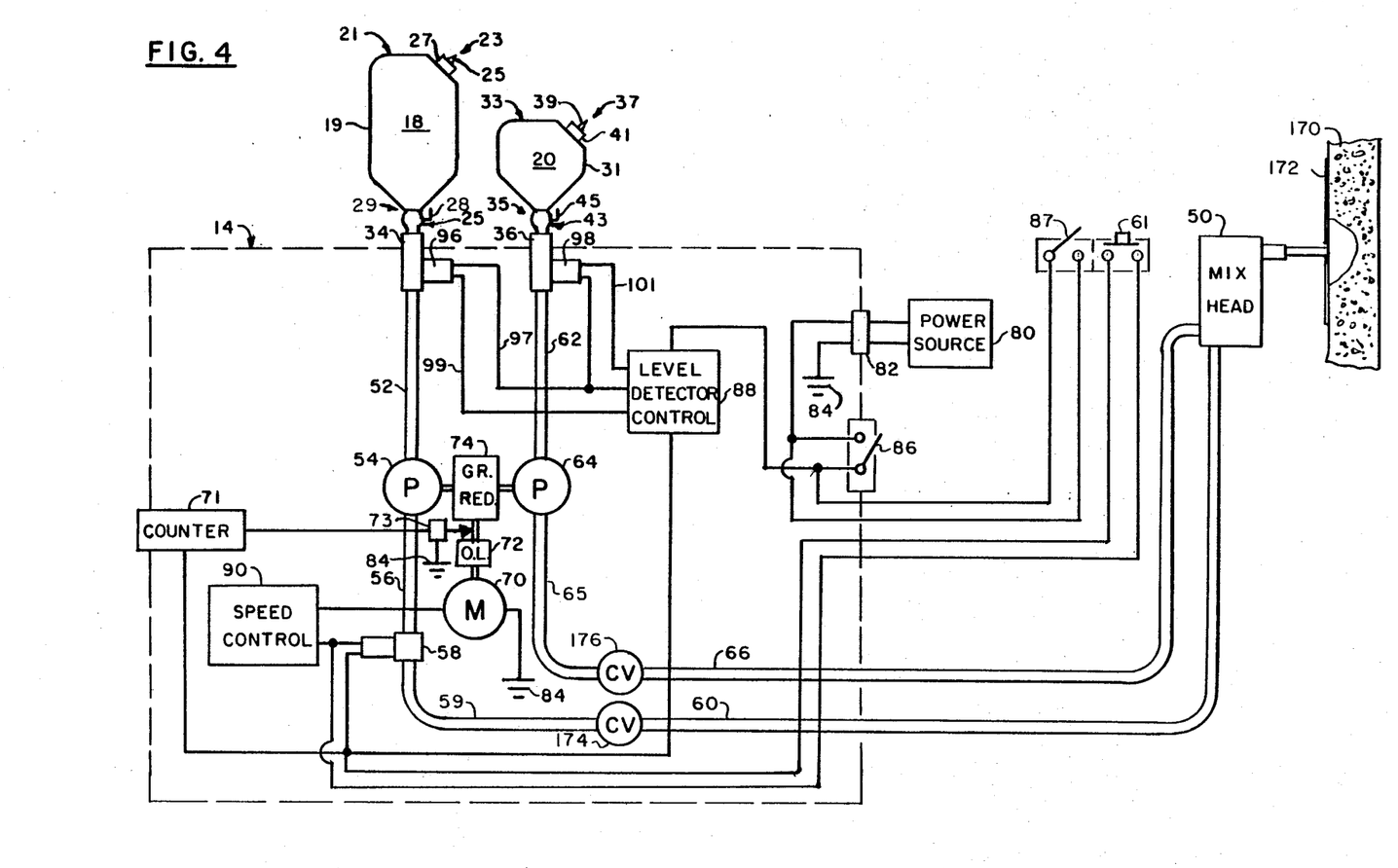
FIG. 4 is a schematic mechanical-electrical diagram of the multiple fluid mixing and dispensing apparatus of the present invention.

With reference to FIG. 4, there is illustrated a schematic mechanical-electrical diagram of the multiple fluid mixing and dispensing apparatus 10 of the present invention showing the item contained within housing 12 and their operation.

In particular, with reference to FIG. 4, disposable first reservoir 18 is connected in fluid communication with mixing head 50 first through first coupling 34, then through conduit 52, first fluid pump 54, conduit 56, past pressure detector switch 58, through conduit 59, through first check valve 174 and finally through conduit 60.

Disposable second fluid reservoir 20 is connected in fluid communication with mixing head 50 first through second coupling 36, then through conduit 62, second fluid pump 64, through conduit 65, through check valve 176 and finally through conduit 66.

First and second fluid pumps 54 and 64, respectively, are driven by a common drive motor 70 mechanically coupled to pumps 54 and 64 through an overload or torque releasable coupling 72 and a gear reduction system 74.

Gear reduction system 74 is adapted to drive pump 64 at a predetermined reduced volume rate relative to pump 54. The gear ratio is adjusted to provide a pumping rate ratio that will give the correct aliquot proportioning of the two liquids necessary to achieve a complete chemical reaction after the mixed fluids leave the mixing head.

In typical gear pump design, two equal displacement pumps are driven at different speeds to secure the pumping ratio. However, it is well known that adhesive components, resin and hardener or curing agent, are typically of different viscosities. Since pumping efficiency goes down with viscosity, equal displacement pumps will not pump two components of different viscosities with equal efficiency. This leads to poor ratioing performance, particularly under low speed and high pressure conditions encountered when using the apparatus of the present invention. These speeds and pressures can range from 0–100 RPM and 0–200 psi, respectively.

To insure proper pump ratioing under all operating conditions, which may vary from 40 degrees F. to 110 degrees F., pump size and speed must be properly selected. Because the curing agent, the material contained in disposable reservoir 20, has a low viscosity, and because the volume of the curing agent delivered is low, about one-half the volume of the resin material in reservoir 18, pump 64 is selected to have a low displacement and is adapted to be operated at a high speed. Under these conditions, it has been found that pumping efficiency is greatly improved and ratioing of the fluid flow can be tightly controlled.

Further, to accurately meter the volume of the fluid being pumped, a digital counter 71 is provided. Digital counter 71 is electrically connected to micro-switch 73 which counts the number of revolutions of motor 70. Counter 71 is adapted to measure the total fluid flow in one-thousandth of a gallon increments. The operator can then record the amount of material delivered to each crack, key way or port or he can tally the entire days volume of material used.

In the event either pump becomes overloaded, torque release coupling 72 allows motor 70 to become disengaged from the pumps until the overload condition is corrected.

Motor 70 is energized using power source 80 which is connected to the electrical system of the present invention through disconnectable electrical connector 82 mounted on housing 12.

One side of disconnectable electrical connector 82 is electrically connected to ground or common 84, while the other side is first connected to "on-off" switch 86 and then in series to level detector control unit 88, pressure switch 58, motor speed control 90 and finally to pump drive motor 70. Electrically connected across "on-off" switch 86 is spring loaded, normally open, hand held switch 87. Switch 87 allows the operator to jog the injection pressure up slowly for sensitive pumping conditions requiring accurate control of injection pressure. The other side of motor 70 is, of course, electrically connected to ground or common 84.

Located adjacent hand held switch 87 is manually operated, normally open, pushbutton switch 61 which is electrically connected across pressure switch 58. Pushbutton switch 61 permits the operator to increase the injection pressure of the resin material above the setting of pressure switch 58 when the need arises.

Level detector 88 further comprises a first fluid level sensor 96 disposed proximate coupling 34 and adapted to measure the fluid level immediately below that coupling.

A second fluid level sensor 98 is disposed proximate coupling 36 and is adapted to measure fluid level immediately below that coupling.

One side of first fluid level sensor 96 and second fluid level sensor 98 is connected together, in common, to conductor 97, which is, in turn, connected to level detector control 88.

The other side of first fluid level sensor 96 is connected through conductor 99 back to level sensor control 88 as is the other side of second fluid level sensor 98 through conductor 101.

With respect to disposable fluid reservoirs 18 and 20, typically, these containers are used both for shipping the two-component resin materials and also doubling as dispensing reservoirs.

Reservoir 18 comprises a generally transparent or translucent housing 19 having a bottom end 21 and a top end 29. Proximate the bottom end 21 of reservoir 18 is a vent assembly 23 comprising a vent seal teat 25 and a cap receptacle 27.

When vent seal teat 25 is cut off to allow displacement air to enter housing 19, the shipping cap (not shown) that sealed top cap end 29 when the container was originally filled and shipped, is adapted to also fit on and be received by cap receptacle 27. Thus seal vent assembly 23 can be sealed closed when reservoir 18 is removed from quick coupling 34 for storage as a partially filled container.

When the shipping cap (not shown) is removed from cap end 29, a reservoir coupling member 25 is attached to cap end 29 to replace the shipping cap. Reservoir coupling member 25 is adapted to engage quick coupling 34 and is also provided with a shut-off valve 28.

When a partially emptied reservoir is to be removed from quick coupling 34, valve 28 is closed and reservoir 18 is removed without spilling any of its contents. Reservoir 18 is then inverted to rest with bottom end 21 down. The original shipping cap (not shown) is attached to cap receptacle 27 prior to inverting the container to prevent loss of fluid from vent assembly 23.

In a like manner, reservoir 20 also comprises a housing 31 having a bottom end 33 and a top end 35. Proximate bottom end 33 of housing 31 is a vent assembly 37 comprising a vent seal teat 39 and a cap receptacle 41.

When vent seal teat 39 is cut off, it will allow displacement air to enter housing 31. The shipping cap (not shown) that seals top end 35 during shipping, is adapted to also engage and be received by cap receptacle 41 and thus seal vent assembly 37 when reservoir 20 is removed from quick coupling 36 for storage as a partially filled container.

When the shipping cap (not shown) is removed from cap end 35, a reservoir coupling member 43 is attached to cap end 35 to replace the shipping cap (not shown). Reservoir coupling member 43 is adapted to engage quick coupling 36 and is also provided with a valve 45.

When a partially emptied reservoir 20 is to be removed from quick coupling 36, valve 45 is closed, reservoir 20 is removed without spilling any of its contents and is then inverted to rest with bottom end 33 down. The original shipping cap (not shown) is attached to cap receptacle 41 to prevent loss of fluid from vent assembly 37.

The above described configuration permits disposable shipping reservoirs 18 and 20 to be connected directly to the apparatus without the need for field transfer of the adhesive components. This will prevent the introduction of contaminants into the pumping apparatus which would tend to accelerate wear of the pumping elements leading to severe damage and destruction of the pumps. Also, since the curing component of the epoxy adhesive system is hygroscopic, the use of the above-described configuration prevents water from contaminating the components, which would, in time, degrade the performance of the cured adhesive.

Because both reservoirs 18 and 20 are transparent (or translucent), the operator can readily check the ratioing performance of the apparatus by comparing the levels and volumes of material in the containers. Further, the operator can detect contamination or incorrect material by the color through the transparent or translucent wall of the container.

Because construction sites and other areas where the apparatus of the present invention is used are generally dirty with various air-borne contaminants such as dust and chemical vapors, the use of the shipping container as the reservoir reduces the possibility of introducing such contaminants into the system to cause the pumps to become eroded and corroded, thus reducing their close ratioing performance.

Figure 5:
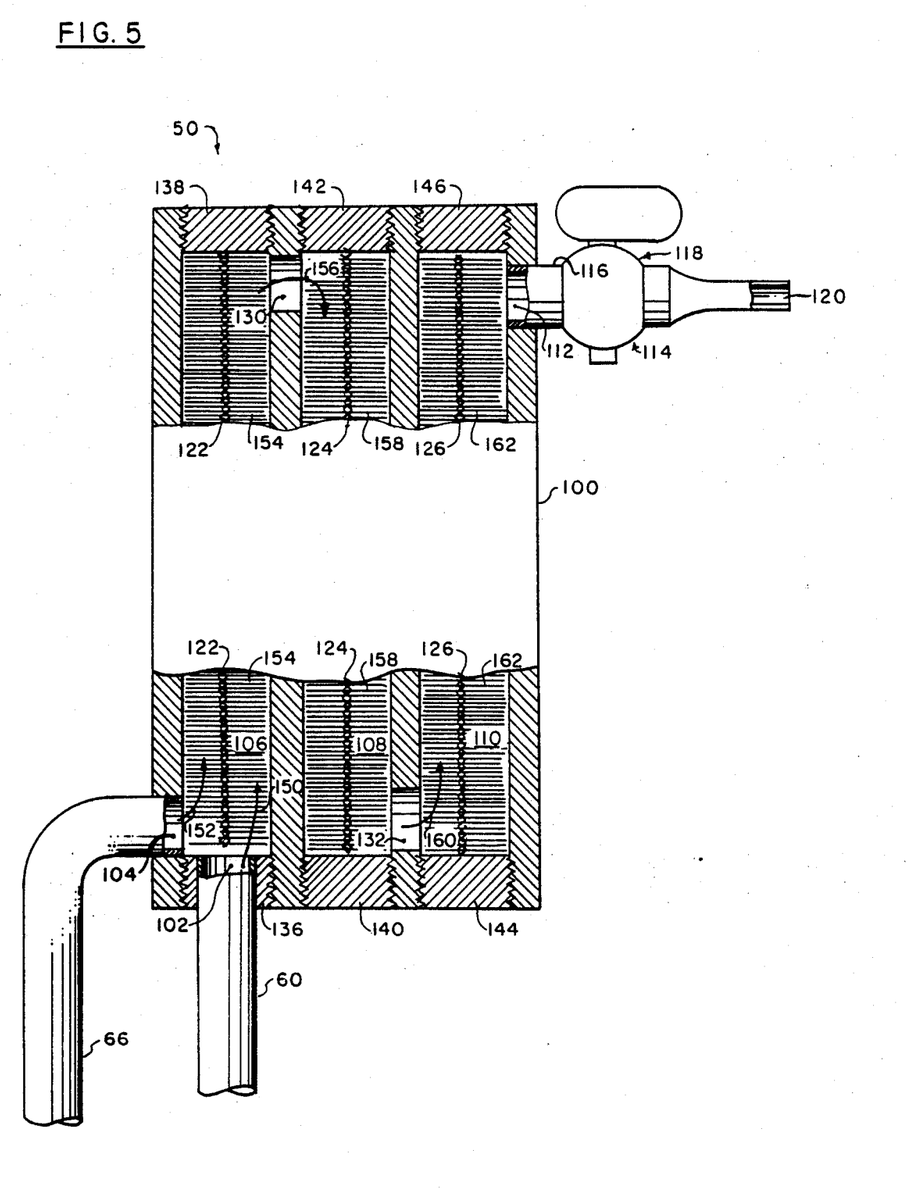
FIG. 5 is a partial cut-away view of the mixing and dispensing apparatus of the present invention.

With reference to FIG. 5, there is illustrated a partial cut-away view of mixing head 50 showing its internal construction.

Mixing head 50 comprises, basically, a body member 100, a first inlet port 102 adapted to receive conduit 60 conducting fluid from first disposable reservoir 18, a second inlet port 104 adapted to receive conduit 66 conducting fluid from second disposable reservoir 20, and outlet port 112 adapted to receive control nozzle 114. A set of mixing channels 106, 108 and 110 provides fluid communication between inlet ports 102-104 and outlet port 112.

Control nozzle 114 comprises an inlet end 116 adapted to engage outlet port 112, a fluid flow control valve 118 and an outlet end 120.

Mixing brushes 122, 124 and 126 are disposed, respectively, in mixing channels 106, 108 and 110.

A first interconnecting port 130 is provided in the wall between mixing channels 106 and 108 distal inlet ports 102 and 104.

A second interconnecting port 132 is located in the wall between channels 108 and 110 distal first interconnecting port 130 and distal outlet port 112.

A first plug 136 is adapted to threadably engage housing 100 at the end of channel 106 proximate inlet port 102. Second plug 138 is also adapted to threadably engage housing 100 at the end of mixing channel 106 proximate first interconnecting port 130 distal inlet port 102.

Third end plug 140 is adapted to threadably engage housing 100 proximate second interconnecting port 132 while fourth plug 142 is adapted to threadably engage housing 100 at the opposite end of channel 108 proximate first interconnecting port 130.

A fifth end plug 144 is adapted to threadably engage housing 100 at the lower end of the housing proximate second interconnecting port 132, while sixth end plug 146 is adapted to threadably engage housing 100 proximate exit port 112.

Thus it can be seen that the two fluids flowing from inlet ports 102 and 104 will become mixed and blended by bristles 154 of brush 122 as it passes up mixing channel 106 towards first interconnecting port 130. As the fluid continues its flow, as indicated by arrow 156, bristles 158 of brush 124 will continue to cause the fluids to become more intimately mixed as they travel towards second interconnecting port 132.

The same is true as the fluids flow in accordance with arrow 160 up mixing channel 110 to be finally mixed by bristles 162 of brush 126 and then flow out of exit port 112 through valve 118 and outlet end 120 of nozzle 114.

To operate the multiple mixing and dispensing apparatus of the present invention, a first disposable reservoir 18 containing, typically, a reactive resin, is connected to quick coupling 34 while a second fluid reservoir 20 containing, typically, an activator or curing agent for the reactive resin, is connected to second quick connector coupling 36. After power source 80 is connected to plug 82, switch 86 is operated to activate motor 70 through speed control 90. When motor 70 is energized, first fluid pump 54 and second fluid pump 64 are actuated through gear reduction unit 74 to obtain a precise ratio of the flow of fluids from disposable container 18 relative to the fluid in disposable container 20. The fluid then simultaneously flows from disposable containers 18 and 20. From container 18 the fluid flows first past level detector 96, then through conduit 52, through pump 54 and conduit 56 past pressure switch 58 into conduit 59, through check valve 174, through conduit 60, and finally to mixing head 50.

In mixing head 50 it is intermixed and blended with the second fluid where it then finally flows out of exit port 102 (FIG. 5) into mixing channel 106. In similar manner, fluid flowing from disposable reservoir 20 flows first past level detector 98, then through conduit 62, through pump 64, through conduit 65, through check valve 176 and conduit 66 to outlet port 104 (FIG. 5) and into mixing channel 106.

The two mixing fluids then pass in and around bristles 154 of brush member 122 towards interconnecting port 130. They then travel down mixing channel 108, being further blended and intermixed by bristles 158 of brush 124, then through second interconnecting port 132, and up through mixing channel 110 to be further intermixed by bristles 162 of brush 126.

The fluid then passes out of mixing head housing 100 through outlet port 112, out through valve 118 and exit end 120 of nozzle 114.

Normally, this particular apparatus is used to inject a polymerizable resin mixture into cracks in a concrete wall 170 for their repair.

To repair a crack in concrete wall 170, a self-adhesive tape, having a width slightly larger that the diameter of nozzle outlet end 120, is placed to span across the crack at intervals along the crack approximately equal to the wall thickness.

Between each tape, the crack is sealed with either of hot-melt adhesive or a two-component, fast curing, epoxy adhesive 172. The material is puttied over the crack and allowed to harden.

The strips of self-adhesive tape are removed prior to the hardening or setting up of adhesive 172. This leaves a series of small access ports along the crack length. The adhesive mixture from reservoirs 18 and 20 is then pumped into the crack by pressing nozzle end 120 against wall 170 at one of the opening created by the removed self-adhesive tape. "On-Off" switch 86 is then actuated to the "On" position. The mixed adhesive material is then pumped into the crack until the resin mixture begins to appear at the next adjacent opening created when the self-adhesive tape was removed.

Nozzle end 120 is then pressed against the crack at the next adjacent opening and the process repeated.

In order to achieve a controlled rate of increase in pressure of the fluid being injected into the crack, a normally open, spring loaded, hand held switch 87, which is electrically connected across "on-off" switch 86, may be used by the operator to "jog" pump motor 70. By turning "on-off" switch 86 to the "off" or open position, hand held switch 87 can then be actuated to activate pump motor 70 to gradually raise the fluid pressure in steps. Pressure switch 58 will protect the system from fluid over-pressure during normal operation.

The pressure at mixing head 50, in particular, outlet end 120, must not be so high as to cause the fluid being injected into the crack to break the seal of the hot-melt or epoxy adhesive 172, placed over the crack on the surface of concrete wall 170. The pressure must also not be so low as to prevent, or appreciably decrease, the flow rate of fluids leaving exit end 120 of nozzle 114.

To prevent such an occurrence, a pressure switch 58 is located on the high pressure side of first pump 54 between conduits 56 and 59. A pressure switch could also be included in conduit 66 on the high pressure side of pump 64, however, the hydraulic pressure in each conduit would be approximately the same as the pressure at exit end 120 of nozzle 114 (not taking into account fluid friction). Thus only one pressure switch is really needed.

Pressure switch 58 is, therefore, adjusted for the optimum pressure needed to meet the requirements stated above.

Under certain circumstances, it may be necessary to inject the fluid mixture out of mixing head 50 at a higher pressure than the pressure setting of pressure switch 58. This would occur, typically, for very fine cracks or where debris in the crack prevents the rapid flow of fluid into the full volume and depth of the crack.

Under these circumstances, the operator can depress normally open, pushbutton switch 61 which is electrically connected across pressure switch 58. This action will temporarily short out pressure switch 58 and allow pump motor 70 to continue pumping should the fluid pressure exceed the pressure setting of pressure switch 58.

When pushbutton switch 61 is released, then pressure switch 58 will resume its function of de-energizing pump motor 70 until fluid pressure is reduced to below the pressure setting of pressure switch 58.

Where a polymerizing resin is being injected into a crack in concrete, it is important that there be a correct mixture of the two resins, otherwise the material will fail to harden and there will be no binding of the two sides of the crack to each other to create a monolithic whole. This usually occurs where there is single component pumping.

To prevent this deficiency, a first level detector 96 is located proximate quick coupling 34 to detect an empty reservoir 18. A second level detector 98 is disposed proximate second quick coupling 36 to detect an empty disposable reservoir 20. If either reservoir 18 or 20 becomes empty, either detector 96 or 98, respectively, will be activated to actuate a disconnect relay, common in the art, (not shown) in level detector control 88 Since level detector control 88 is connected in series with speed control 90 and motor 70, motor 70 will become deactivated and pumping will stop.

After the multiple fluid mixing and dispensing apparatus 10 of the present invention has been used, it can be cleaned by pumping solvent through the conduit and pumping system with mixing head 50 being cleaned by removing plugs 138, 142 and 146 and then removing brushes 122, 124 and 126. Housing 100 can then be easily cleaned with a minimum of solvent. The brushes can be thrown away without cleaning.

In order to prevent inadvertent switching of the two reservoirs with the resultant wrong mixing of the two fluids, top end 29 of reservoir 18 is made to have a different cap diameter than the cap diameter at top end 35 of reservoir 20.

Also, in order to permit an operator to monitor the proper proportioning of the fluids being pumped, a scale 51 is provided along the side of reservoir 18 whose graduations can be coordinated with the graduations of a similar scale 53 along the side of second reservoir 20. The scales can be either molded into the reservoir material itself or applied to the surface of the reservoir.

With respect to FIG. 6A and 6B, there is illustrated a more detailed drawing of the positioning of the operating handle 26 relative to main housing 12. The operating handle of FIGS. 6A and 6B comprises, basically, a shaft portion 180, a curved portion 182 and a T-shaped handlebar 184.

In addition, a lifting eye 17 is provided at the top of handle 26 to permit the apparatus to be lifted to the job site.

A retaining pin 15 is also provided in bracket 28 to hold handle 26, proximate the bottom end of shaft 180, in place while lifting and steering the apparatus.

In FIG. 6A, operating handle 26 is shown in its normal position when rolling the apparatus of the present invention about the job site.

In FIG. 6B, operating handle 26 has been rotated 180 degrees by removing retaining pin 15, rotating shaft 180 180 degrees in bracket 28 and then re-inserting pin 15 back through bracket 28 and shaft portion 180.

As shown in FIG. 6B, lifting eye 17 is located directly over center of gravity 188 of the apparatus. Thus, the apparatus of the present invention can be lifted in an up-right position by a crane or other device and moved about the job site without causing spillage or leakage of fluids from the apparatus during such movement.

Further, where a restricted entrance limits movement of the apparatus to its place of use, reservoir support bracket 16 is adapted to be easily removable through the use of bolts or the like whereby housing 12, minus steering handle 26, reservoirs 18 and 20, and reservoir support bracket 16, can pass through a small opening followed by the removed parts for simple assembly at the place of use.

Thus a multiple fluid mixing and dispensing system is provided offering significant improvements over the prior art.

I claim:

1. An apparatus for mixing and dispensing a fluid comprising a first fluid reservoir,
   a second fluid reservoir,
   a first fluid pump having an inlet port and an outlet port, said inlet port in fluid communication with said first reservoir,
   a second fluid pump having an inlet port and an outlet port, said inlet port in fluid communication with said second reservoir,
   means for driving said first and second pumps at a respective speed inversely proportional to the respective viscosity of said fluid being pumped and at a predetermined ratio of fluid flow, said fluids being generally at atmospheric pressure at the inlet port of said first and second pumps,
   a power source electrically connected to said means for driving said first and second pumps,
   a mixing head,
   means for fluidly communicating said mixing head with said outlet port of said first pump,
   means for fluidly communicating said mixing head with said outlet port of said second pump,
   means for measuring fluid pressure of said fluid between said first pump and said mixing head,
   means for electrically disconnecting said means for driving said first and second pumps when said fluid pressure exceeds a predetermined pressure and electrically connecting said power source to said means for driving said fist and second pumps when said pressure is less than said predetermined pressure.

2. The apparatus for mixing and dispensing a fluid as claimed in claim 1 wherein said mixing head comprises
   means defining a mixing channel having an inlet end and an outlet end,
   said means for fluidly communicating said mixing head with said outlet port of said first pump being connected to said inlet end of said mixing channel,
   said means for fluidly communicating said mixing head with said outlet port of said second pump being connected to said inlet end of said mixing channel,
   an injection nozzle connected in fluid communication with said outlet end of said mixing channel,
   a valve connected to said nozzle and adapted to control the flow of fluid to said nozzle, and
   a brush disposed in said mixing channel having a plurality of bristles adapted to project into said mixing channel.

3. An apparatus for mixing and dispensing a fluid comprising means defining a housing,
   a first fluid reservoir adapted to be mounted proximate the top of said housing,
   a second fluid reservoir adapted to be mounted proximate the top of said housing,
   a first fluid pump having an inlet port and an outlet port mounted within said housing, said inlet port being in fluid communication with said first reservoir,
   a second fluid pump having an inlet port and an outlet port mounted within said housing, said inlet port being in fluid communication with said second reservoir,
   means for mechanically connecting said first pump to said second pump for proportionally pumping fluid from said first and second fluid reservoirs at a predetermined volume ratio,
   means for driving said first and second pumps at a respective speed inversely proportional to the respective viscosity of said fluid being pumped,
   means for energizing said means for driving said pumps connected to said means for driving said pumps, means, in fluid communication with said inlet port of said first pump for detecting the absence of fluid and stopping said means for driving said first and second pumps when an absence of fluid is detected,
   means in fluid communication with said inlet port of said second pump for detecting the absence of fluid and stopping said means for driving said first and second pumps when the absence of fluid is detected,
   a mixing head having a first inlet port and a second inlet port,
   means for fluidly communicating said outlet port of said first pump with said first inlet port of said mixing head,
   means for fluidly communicating said outlet port of said second pump with said second inlet port of said mixing head, and
   means for mechanically disconnecting said first and second pumps from said means for driving said pumps when fluid pressure within either of said pumps reaches a predetermined maximum pressure.

4. An apparatus for mixing and dispensing multiple fluids comprising
   means defining a housing,
   at least two fluid reservoirs adapted to be mounted proximate the top of said housing,
   at least two fluid pumps, each pump in fluid communication with a respective reservoir and adapted to be mounted inside said housing, the pressure of fluids in said reservoirs communicating with said pumps being generally at atmospheric pressure, means for driving said pumps at a respective speed inversely proportional to the respective viscosity of said fluid being pumped, means connecting said pumps to each other for proportionally pumping fluid from said fluid reservoirs at a predetermined volume ratio, means in fluid communication with the inlet side of said pumps for detecting the absence of fluid and stopping said means for driving said pumps when an absence of fluid is detected, a mixing head having first and second inlet ports each in fluid communication with one of said pumps.

5. An apparatus for mixing and dispensing a mixture of several fluids comprising a mixing nozzle, means defining a first fluid reservoir containing a fluid having a first viscosity, means defining a second fluid reservoir containing a fluid having a second viscosity, a first fluid pump having a first volume displacement and having an inlet port in fluid communication with said first reservoir an outlet port in fluid communication with said mixing nozzle, a second fluid pump having a second volume displacement and having an inlet port in fluid communication with said second reservoir and an outlet port in fluid communication with said mixing nozzle, and means for driving said first and second pumps at a speed inversely proportional to the respective viscosities of said fluids being pumped and at a predetermined ratio of fluid flow, said fluids from said first and second reservoirs being at atmospheric pressure as they enter the respective inlet port of said first and second pumps.

6. The apparatus for mixing and dispensing a mixture of several fluids as claimed in claim 5 wherein said first reservoir contains a fluid having a first viscosity higher than the fluid in the second reservoir, and said second reservoir contains a fluid having a second viscosity lower than the fluid in said first reservoir, and said means for driving said first and second pumps comprises means for driving said first pump in fluid communication with said higher viscosity fluid in said first reservoir at a relatively slow speed and driving said second pump in fluid communication with said lower viscosity fluid in said second reservoir at a relatively high speed with the volumetric displacement of said respective first and second pumps established to pump said two fluids to said mixing head at a predetermined ratio of fluid flow.

* * * * *